Oct. 8, 1957 F. H. J. VAN DER POEL ET AL 2,809,337
MOTOR CONTROL ARRANGEMENT
Filed July 25, 1955

INVENTORS
FRANCISCUS HENRICUS JOZEF VAN
DER POEL
JOSUÉ JEAN PHILIPPE VALETON
BY
Fred M Vogel
AGENT

United States Patent Office 2,809,337
Patented Oct. 8, 1957

2,809,337

MOTOR CONTROL ARRANGEMENT

Franciscus Henricus Jozef van der Poel and Josue Jean Philippe Valeton, Eindhoven, Netherlands, assignors, by mesne assignments, to North American Philips Company, Inc., New York, N. Y., a corporation of Delaware Application July 25, 1955, Serial No. 524,118

Claims priority, application Netherlands August 3, 1954

3 Claims. (Cl. 318—175)

The present invention relates to a motor control arrangement.

U. S. patent application, Serial No. 495,972, filed March 22, 1955 describes a synchronous motor driving films for television scanning purposes in order to ensure synchronism between the film motion and the frame synchronization pulses of the television signal and the correct phase between them as well as a rapid start. The armature comprises permanent magnetic poles and a cage winding with preferably projecting poles, the number of which corresponds to the number of permanent magnetic poles.

This purpose may be attained with the use of a synchronous motor of the present invention. In accordance with the invention, in a synchronous motor, the armature is coupled to a disc made from electrically conducting material and rotatably arranged between the poles of an electromagnet. The electromagnet is supplied with pulsatory current in such manner that only a part of the disc appears between the said poles at any time. The disc is provided with recessed portions such that, when the motor is out of its correct phase, the remaining part of the disc is braked by the pulsatory field on the electromagnet to acquire the correct phase. When the motor is in its correct phase, the disc is practically no longer braked, since the recessed portions of the disc are then positioned between the poles at the instances at which the pulsatory field of the electromagnet mainly occurs.

With respect to the above-mentioned U. S. patent application, in which two different positions of the rotor relative to the stator rotary field are possible in a four-pole motor, only one position of the rotor relative to the rotary field is possible in accordance with the present invention, which is sometimes advantageous.

In order that the invention may be readily carried into effect it will now be described with reference to the accompanying drawing, in which.

Figure 1:
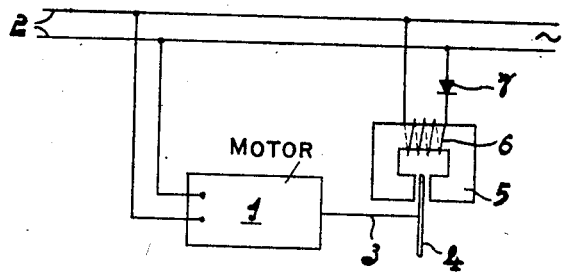
Fig. 1 is a schematic diagram of an embodiment of a motor control arrangement in accordance with the present invention.
Figure 2:
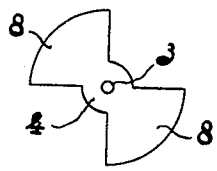
Fig. 2 is a schematic diagram in elevation of an embodiment of the disc 4 of Fig. 1.

Fig. 1 shows a synchronous motor 1 comprising a cage armature for starting up asynchronously and which is connected to A. C. power supply lines 2. Secured to the armature of the motor through the motor shaft 3 is a disc 4 which may be made from copper. The disc 4 is provided with recessed portions, for example as shown in Fig. 2. The disc 4 is adapted to rotate between the poles of an electromagnet 5 which is supplied with pulsatory current from the A. C. supply lines 2 by means of a coil 6 and rectifier 7.

Figure 3:
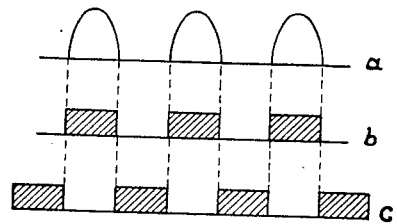
Fig. 3 is a graphical illustration aiding in the understanding of the operation of the arrangement of Fig. 1.

Consequently, the field set up between the poles of the electromagnet 5 has the aspect shown in Fig. 3a, each pulse having a duration of $\frac{1}{100}$ second at a power supply frequency of 50 cycles per second.

If the motor makes 1500 revolutions per minute, or 25 revolutions per second, it takes $\frac{1}{25}$ second per revolution, whence it follows that each part 8 of the disc 4 remains between the poles of the electromagnet 5 for $\frac{1}{100}$ second. This is diagrammatically shown as a function of the time in Fig. 3b, where the hatched parts represented the time during which copper is present between the poles of the electromagnet 5. In Fig. 3c, the phase is displaced 180° in time. The poles of the electromagnet 5 are so arranged with respect to the disc 4 that, if the motor is running in the correct phase, the phase relationship between the rotating disc and the power supply voltage is as indicated in Figs. 3a and 3c. That is, the electromagnet field pulses appear only when there is no copper of the disc 4 between the poles of said electromagnet, and no braking moment will be exerted on said disc.

If the motor runs out of its correct phase, the phase-relationship between the rotating disc 4 and the power supply voltage is as shown in Figs. 3a and 3b, and the motor will be braked. If the motor then slips one half pole pitch (180° electrically), the situation is again as shown in Figs. 3a and 3c, so that no further braking action occurs.

This is carried through automatically by energizing the coil 6, for example through a relay (not shown), by means of the rectified voltage for, say 1 or 2 seconds, on starting up the motor when it runs almost synchronously.

For different motor speeds, different discs must be utilized, or suitable transmission means must be provided between the motor shaft 3 and the disc 4.

What is claimed is:

1. A circuit arrangement for a motor having an armature and adapted to be energized from an alternating current source, comprising an electromagnet having magnetic poles, means for supplying said electromagnet with pulsating current having a constant phase relationship to said alternating current source, a disc comprising electrically conducting material coupled to said armature and arranged to rotate between said poles, said disc having a recessed portion which occupies a position between said poles during the occurrence of a pulse in said supplying means when said armature is rotating with the desired phase relationship and a material portion which occupies a position between said poles during the occurrence of a pulse when said armature is rotating with an undesired phase relationship thereby exerting a braking force on the said armature when the said armature is rotating with an undesired phase relationship.

2. A circuit arrangement for a motor having an armature and adapted to be energized from an alternating current source, comprising an electromagnet having magnetic poles, means for supplying said electromagnet with pulsating current having a constant phase relationship to said alternating current source, a disc comprising electrically conducting material coupled to said armature and arranged to rotate between said poles, said disc having two recessed portions which occupy a position between said poles during the occurrence of a pulse in said supplying means when said armature is rotating with the desired phase relationship and two material portions which occupy a position between said poles during the occurrence of a pulse when said armature is rotating with an undesired phase relationship thereby exerting a braking force on the said armature when the said armature is rotating with an undesired phase relationship.

3. A circuit arrangement for a synchronous motor having an armature and adapted to be energized from an alternating current source, comprising an electromagnet having magnetic poles, means for supplying said electromagnet with pulsating current having a constant phase relationship to said alternating current source, a disc comprising electrically conducting material coupled to said armature and arranged to rotate between said poles, said disc having removed sections which occupy a position between said poles during the occurrence of a pulse in said supplying means when said armature is rotating with the desired phase relationship and material sections which occupy a position between said poles during the occurrence of a pulse when said armature is rotating with an undesired phase relationship thereby exerting a braking force on the said armature when the said armature is rotating with an undesired phase relationship.

References Cited in the file of this patent
UNITED STATES PATENTS
2,297,472    Hahn et al. _____ Sept. 29, 1942